Sept. 15, 1964 H. A. SHINDLER 3,148,699
CONTAINMENT AREA DEVICE
Filed Oct. 17, 1962 3 Sheets-Sheet 1
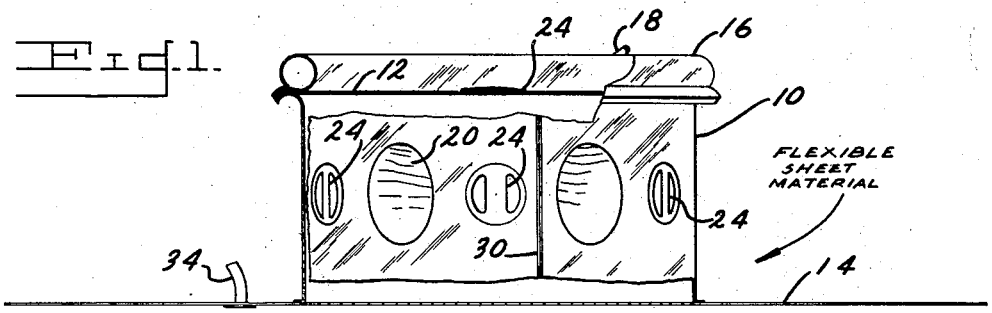
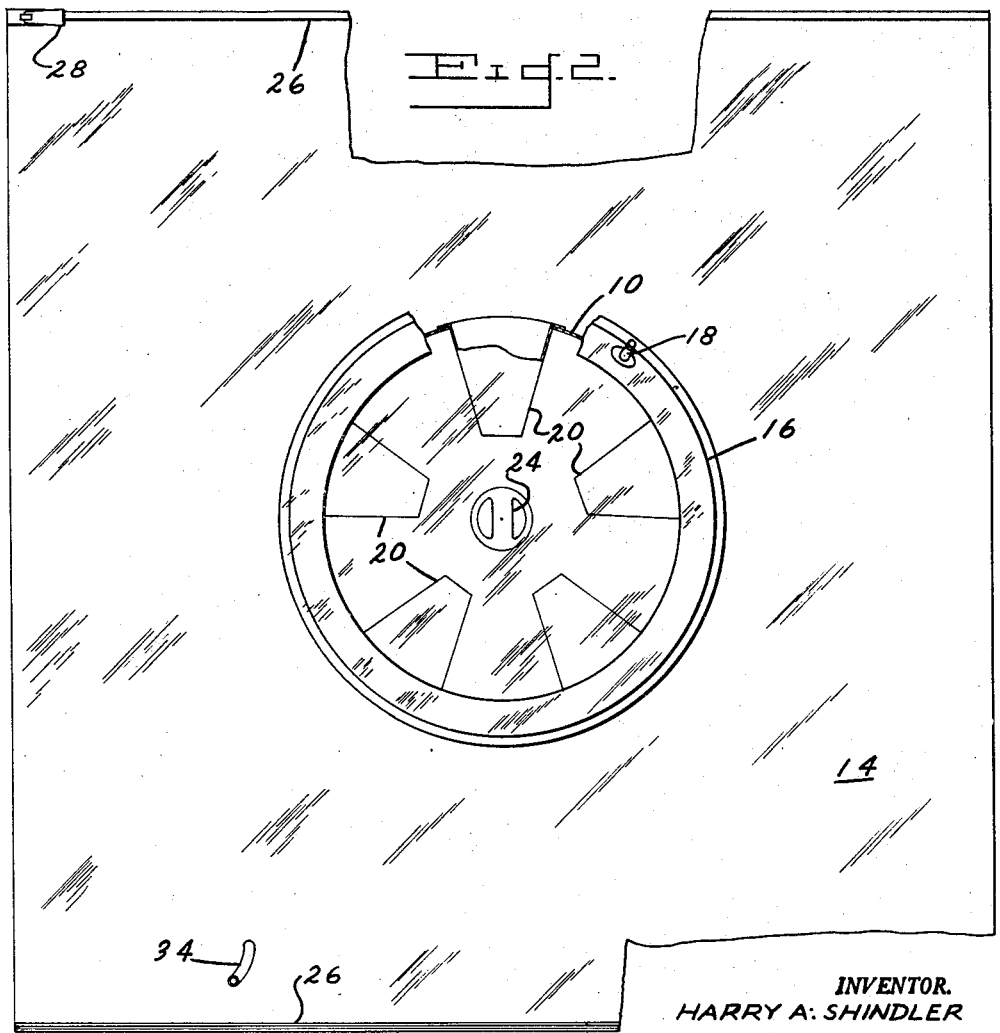
INVENTOR.
HARRY A. SHINDLER
BY Chapin & Neal
Attorneys

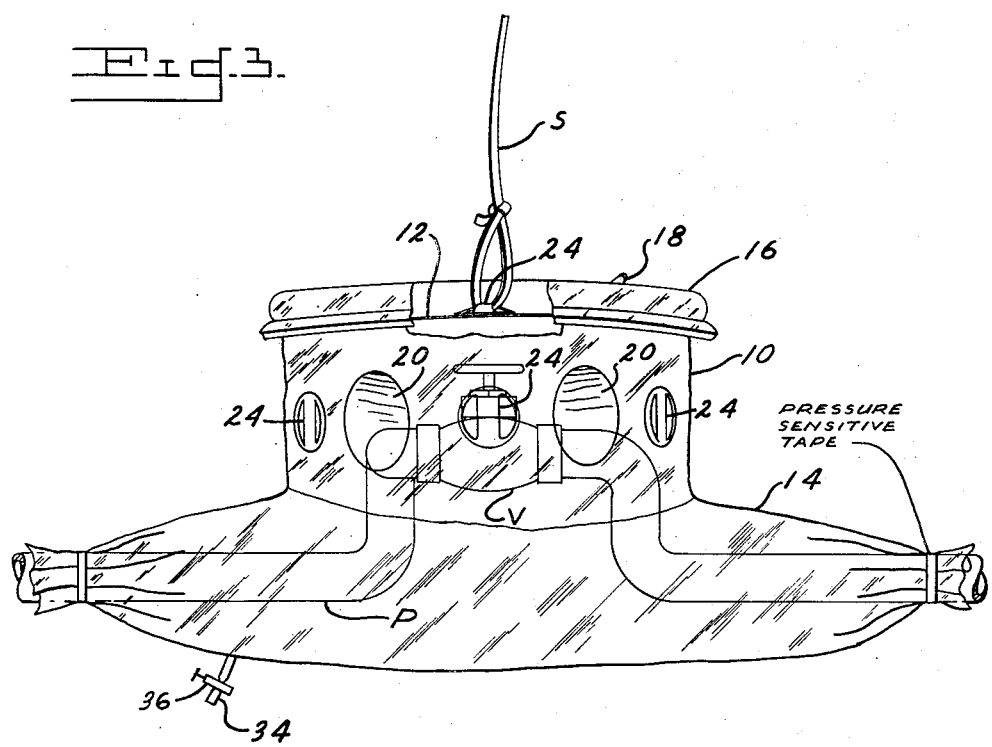
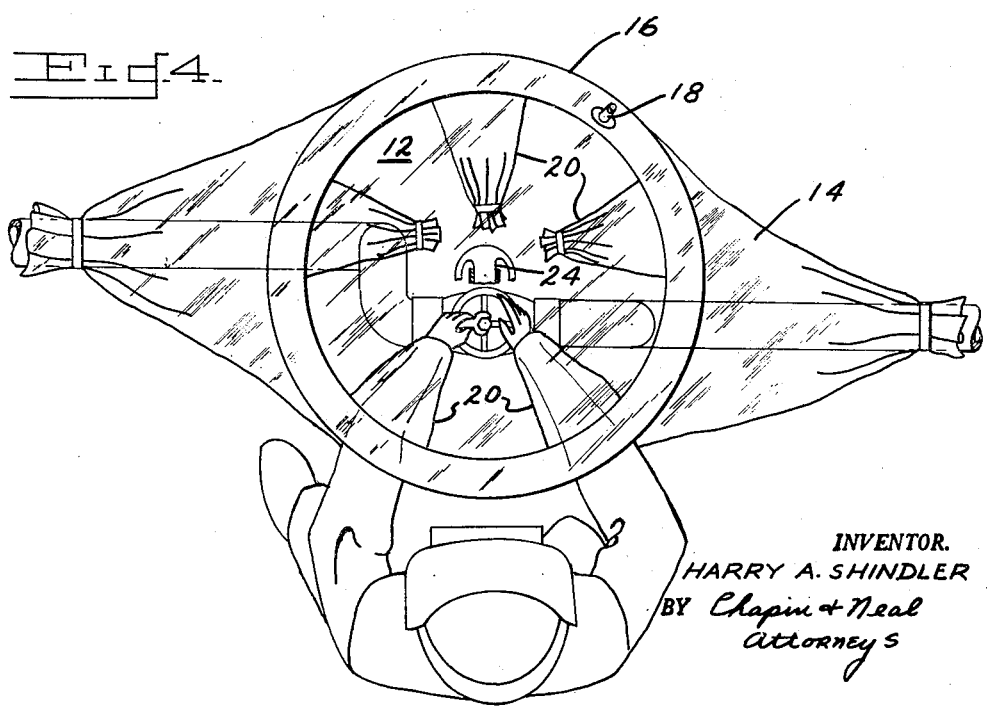

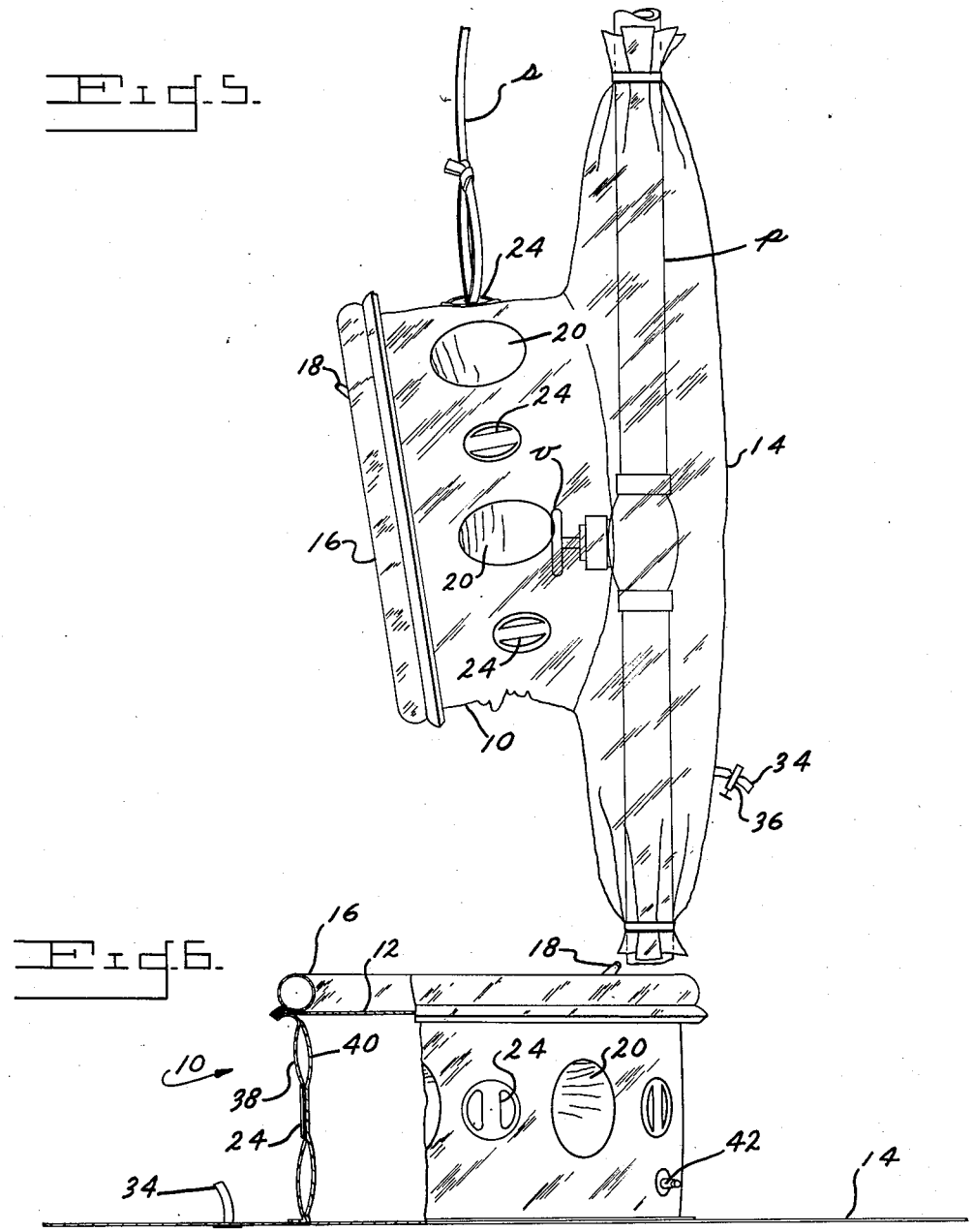

United States Patent Office 3,148,699
Patented Sept. 15, 1964

3,148,699
CONTAINMENT AREA DEVICE
Harry A. Shindler, 87B Loomis Drive,
West Hartford, Conn.
Filed Oct. 17, 1962, Ser. No. 231,212
10 Claims. (Cl. 137—382)

The present invention relates to improvements in protective devices and more particularly to such devices which are used where radioactive or toxic materials are involved.

There are today very serious problems in repairing valves or other components of a working atomic energy power plant. These problems exist in stationary power plants, but are even more serious in the cramped quarters of nuclear submarines where valves and other components are often difficult to reach. The piping of such power plants is usually complex so that it is very expensive or impractical at best to install permanent protective shelters, known as "cold boxes," around each component where a failure might occur. Thus, in many instances, the repairing of a valve or the like is done by a worker wearing protective clothing. The repair job inevitably results in the spilling of radioactive water or other radioactive material which usually requires decontamination of every surface of the room in which the repair is made. The time required to decontaminate after repairing a valve on a nuclear submarine can often cause the submarine to be unfit for action for periods far greater than is desirable.

There are many other occasions where radioactive materials must be handled under circumstances in which the use of a permanently installed cold box is impractical, or where the radiation is not of a character requiring heavy lead shielding and complicated remote manipulators, as has been developed for handling such materials as U-235 and plutonium.

The present invention also has utility in solving the problems of working on materials in a toxic atmosphere. An example of this is found in the machining of beryllium in a manner which will create beryllium dust. An atmosphere containing beryllium dust is highly toxic and makes such machining both difficult and dangerous.

The problems outlined above illustrate situations and conditions where the present invention can be employed, but this in no sense is to be taken as a limitation on the utility of the invention itself.

One object of the present invention is to facilitate working upon components or parts where radioactivity or toxic atmospheres are involved.

Another object of the invention is to provide a relatively inexpensive protection device which satisfies the ends set forth above and which is readily adaptable for use under widely varying conditions, particularly where access to the repair point is difficult.

A further object of the invention is to provide a device which satisfies the above objects and which is lightweight and portable so that it may be readily installed wherever the need may occur.

The present invention fulfills the above ends by the provision of an essentially flexible enclosure which contains the atmosphere of a work area within the enclosure. With this in mind the present device is called a containment area device.

The device itself is provided with inwardly projecting sleeves which enable access to whatever is being worked on. In usual practice rubber gloves are sealingly secured to at least two of the sleeves to permit a worker to manipulate parts or tools within the enclosure provided by the device, and the remaining unused sleeves, if there are any, are tied off. One characterizing feature of the device is that a portion thereof comprises an inflatable chamber separate from the enclosure within which work is being performed. The inflatable chamber, when inflated, gives shape to the enclosure to facilitate work to be performed therein. One preferred form of inflated chamber is an annular at the upper end of a tubular portion of the enclosure.

Other preferred features include the provision of straps on the tubular enclosure which may be attached to hangers to position the enclosure. A skirt may also be advantageously provided at the lower end of the tubular portion of the enclosure. This skirt may be wrapped around a pipe with the tubular portion in register with a valve to be repaired. Means are provided for sealingly securing opposite sides of the skirt and then the ends of the skirt may be clamped against the pipe to complete installation of the containment area device. The valve itself is now contained within a sealed chamber provided by the containment area device. Any water or other material spilt in repairing the valve will be held in the containment area device and then neatly drained to an appropriate disposal container through a drain tube provided for this purpose.

The above and other related objects and features of the invention will be apparent from a reading of the following description of the disclosure found in the accompanying drawings, and the novelty thereof pointed out in the appended claims.

In the drawings:

FIG. 1 is an elevation, partly in cross section, of a containment area device embodying the present invention;

FIG. 2 is a plan view with portions broken away of the device seen in FIG. 1;

FIG. 3 is an elevation illustrating the manner of using this device for the repair of a valve;

FIG. 4 is a plan view of the showing of FIG. 3, also illustrating the position of a worker;

FIG. 5 illustrates the same device employed to repair a valve on a vertically disposed pipe;

FIG. 6 is an elevation partly in section of an alternate embodiment of the invention.

Referring now to FIGS. 1 and 2, the construction of the present containment area device will now be described. Essentially the device takes the form of an enclosure formed of flexible, impervious sheet material, preferably a plastic such as transparent polyvinyl chloride. The enclosure in the preferred form comprises a tubular portion 10, which has a top wall 12 sealed to its upper end, and a skirt 14 sealed to its lower end. The skirt 14 has an opening therein aligned with the tubular portion 10.

An inflatable chamber preferably taking the form of an annular ring 16, also formed of a flexible plastic material, is secured to the upper end of the tubular portion 10. The marginal edge portions of the upper end of tubular portion 10, the top wall 12 and ring 16 may all be joined by a common, continuous heat seal. A valve 18 is provided for inflation of the annular ring 16 and to maintain it inflated. Inflation may be accomplished either by a pump or orally.

A series of sleeves 20 project inwardly of the tubular portion 10 and are sealed thereto in register with openings therein. Conveniently the sleeves 20 are separate elements sealed to the tubular portion 10.

A series of loops 24 are sealed at their marginal edges to the tubular portion 10 and also one or more loops 24 may be sealed in the same manner to the top wall 12. The loops 24 provide means for positioning the containment area device as will later be more apparent.

The skirt 14 is provided with continuous separable fastener elements 26 running along opposite marginal edge portions, with a slide 28 being provided to connect the fastener elements 26. The separable fastener elements are preferably formed of plastic and provide a sealed seam which is leak-proof under ordinary pressure conditions. Examples of such separable fasteners may be found in U.S. Patents 2,588,367, 2,637,085, and 2,613,421. An access opening in the form of a vertical slit is provided in the tubular portion 10 and similar separable fastener elements 30 may be provided to seal this access slit in normal use.

Referring now to FIGS. 3 and 4, one use of the present invention will be described. The tube 16 is inflated to give shape to the portion of the enclosure comprising the tubular portion 10. This tubular portion is placed in register with a valve V which is installed in a pipe P. A strap S is connected to the loop 24 in the top wall 12 and connected to an appropriate support to position the enclosure. The marginal edge portions of the skirt 14 are brought beneath the pipe P and connected by the fastener elements 26 (not seen in FIGS. 3 and 4). The end portions of the skirt 14 are then gathered around and clamped against the pipe P and secured thereto as by the use of pressure sensitive tape.

In the present instance it is contemplated that a single workman will repair the valve V and therefore a pair of gloves will be connected to two of the sleeves 20. Again pressure sensitive tape may be employed to attach the gloves to the sleeves, or any other attaching means forming a leak-proof seal may be used, or the gloves may be integrally formed with the sleeves. The ends of the remaining sleeves 20 will be gathered together and sealed again by appropriate means such as pressure sensitive tape. If need be, a pair of gloves could also be secured to a second pair of sleeves 20 in order that two workmen could work on the valve at the same time.

It is now possible for a workman as seen in FIG. 4 to repair the valve V, with whatever toxic or radioactive materials which may escape being confined wholly within the containment area device. Tools required for the repair job may be either passed through the sleeves 20 or through the vertical access slit which is normally sealed by the separable fastener 30. Also, if it is desired to maintain a positive or negative pressure atmosphere within the containment area device, tubing from a pump may be passed through the sleeves 20 which would then be sealed thereto.

In the case of repairing a valve in an atomic energy power system, it is to be expected that at least some, and perhaps a considerable quantity of radioactive water will escape from the valve or piping during the repair job. This water will be contained within the containment area device and may be drained therefrom through an appropriate drain tube 34 which is normally sealed by appropriate means such as a clamp 36. Once the repair job is completed, whatever water is within the containment area device will be drained therefrom and then the device may be removed and normal operation resumed. It will still be necessary to decontaminate the specific area within the containment area device after the repair is finished, but the decontamination process will be greatly simplified.

FIG. 5 illustrates another application of the same containment area device. In this instance it is desired to repair a valve v on a vertically disposed pipe p. Again the tubular portion 10 which is given shape by the inflated ring 16, is placed in register with the valve v and maintained in that position by a strap s connected to one of the loops 24. In this instance the loop 24 is on the tubular portion 10.

Again it is contemplated that a single workman will repair the valve and gloves are secured to the two sleeves 20 which best fit his needs. The repair of the valve will then be essentially the same as described in FIGS. 3 and 4 with the drain tube 34 again permitting any water which might be spilt from the pipe to be conveyed to a bucket or other container without contaminating any great area.

Reference is now made to FIG. 6 for a description of an alternate embodiment of the present invention. In this instance the construction of the device is essentially the same as described before and like reference characters are employed to indicate corresponding parts. The prime difference is that the tubular portion 10 is formed by two sheet material walls 38 and 40 which are secured together at their upper and lower ends to provide a second inflatable chamber. The walls 38 and 40 are also secured together in the areas where the loops 24 are attached and also in the areas surrounding the openings for the sleeves 20. This actually produces a tufted effect so that a relatively thin inflated chamber is provided by this double wall construction which gives a compact configuration that nonetheless provides support for the tubular portion of the enclosure. A valve 42 is provided to seal this second inflatable chamber once it is inflated, either orally or by use of a pump.

The annular inflatable chamber 16 may advantageously be used in combination with the inflatable tubular portions or may be dispensed with, dependent upon the needs of a given application.

The use of the device seen in FIG. 6 is essentially the same as that previously described with the first embodiment and a further description is not felt necessary.

In the construction of the present containment area device, a wide range of sizes and shapes may be employed to meet the particular requirements of a given situation or a given type of application. It is preferred that the sheet material employed be a transparent polyvinyl chloride or a similar material, since this material gives visual access to the interior of the enclosure and is also highly effective as a barrier to low energy radiation such as alpha and most beta radiation. However, it is possible that other plastic materials or even other non-plastic materials could be employed in forming the enclosure of this containment device so long as they are essentially impervious and essentially flexible and so long as at least a portion of the containment area device and preferably the top wall 18 thereof is transparent.

Various modifications of the device hereindisclosed will be apparent to those skilled in the art and the scope of the invention is to be derived from the following claims.

Having thus described the invention, what is claimed as novel and desired to be secured by Letters Patent of the United States is:

1. In combination with a pipe system a containment area device comprising a flexible, impervious sheet material enclosure, at least a portion of which is transparent, said enclosure being sealingly attached to said pipe system and preventing contaminants from said pipe system from passing beyond said enclosure and having a plurality of inwardly projecting flexible sleeves, said device further comprising an inflatable chamber also formed of flexible sheet material, said inflatable chamber being disposed exteriorly of the space within said enclosure and remote from its attachment to said system and providing means, when inflated, for giving shape to said enclosure.

2. A containment area device comprising a flexible, impervious sheet material enclosure, said enclosure comprising a tubular portion having a transparent top wall, a plurality of inwardly projecting flexible sheet material sleeves secured to said tubular portion in register with openings therein, and a flexible sheet material skirt having an opening therein in register with said tubular portion and with the lower end of said tubular portion sealed to said skirt, said skirt being adapted to encircle a pipeline with opposite longitudinal edge portions joined and with its opposite ends adapted to be sealed to the pipeline, said device further comprising an inflatable chamber also formed of flexible sheet material, said inflatable chamber being disposed exteriorly of the space within said tubular portion and providing means, when inflated, for giving shape to said tubular portion.

3. A containment area device as in claim 2 wherein separable fastener elements are provided along opposite marginal edge portions of said skirt to provide the joining means therefor, and further wherein is provided a drain tube in said skirt.

4. A containment area device as in claim 3 in combination with a pipe line having a valve interposed therein wherein the tubular portion is in register with said valve and the separable fastener is closed to seal the opposite sides of said skirt in encircling relation with said pipe line, and further wherein the opposite ends of said skirt are gathered and means are provided for clamping said gathered ends against said pipe line on opposite sides of said valve.

5. In combination with a pipe system a containment area device comprising a flexible sheet material enclosure sealingly attached to said pipe system and preventing contaminants from said pipe system from passing beyond said enclosure, said enclosure comprising a tubular portion having a transparent top wall, an inflatable annular chamber also formed of flexible sheet material at the upper end of said tubular portion remote from the attachment of the enclosure to said system, said inflatable chamber providing means when inflated for giving shape to said tubular portion, said tubular portion further having a plurality of inwardly projecting flexible sheet material sleeves secured thereto in register with openings therein.

6. A containment area device as in claim 5 wherein loops are secured to said tubular portions for the attachment of straps thereto in positioning said containment area.

7. A containment area device comprising a flexible impervious sheet material enclosure, said enclosure comprising a tubular portion having a transparent top wall, said tubular portion being formed by a pair of sheet material walls secured together at their upper and lower ends and providing an inflatable chamber which when inflated provides means for giving shape to said tubular portion, a plurality of inwardly projecting sheet material sleeves secured to said tubular portion in register with openings therein, said sleeves being secured to both of the sheet material walls defining said openings.

8. A containment area device as in claim 7 wherein a plurality of loops are secured to said tubular portion and are sealed to both walls thereof, said loops providing means for attachment to straps to position said tubular portion.

9. A containment area device comprising a flexible, impervious sheet material enclosure, said enclosure comprising a tubular portion having a transparent top wall, an inflatable annular chamber also formed of flexible sheet material at the upper end of said tubular portion, said inflatable chamber providing means when inflated for giving shape to said tubular portion, said tubular portion further having a plurality of inwardly projecting flexible sheet material sleeves secured thereto in register with openings therein, a flexible sheet material skirt having an opening therein in register with said tubular portion, and with the lower end of said tubular portion sealed to said skirt, separable fastener elements disposed along marginal edge portions of said skirt providing means for sealingly joining said edge portions, and a plurality of loops secured to said tubular portion and to said top wall to provide means for attachment of straps for positioning said tubular portion.

10. A containment area device as in claim 9 in combination with a pipe line having a valve interposed therein, wherein the tubular portion is in register with said valve, the separable fastener is closed to seal the opposite sides of said skirt in encircling relation with said pipe line, and the opposite ends of said skirt are gathered and means are provided for clamping said gathered ends against said pipe line on opposite sides of said valve, and a supporting strap is attached to one of said loops for positioning said tubular portion.

References Cited in the file of this patent

UNITED STATES PATENTS

| | | |
|---|---|---|
| 441,141 | Dalton | Nov. 25, 1890 |
| 2,473,033 | Letac | June 14, 1949 |
| 2,601,840 | Smith | July 1, 1952 |
| 2,737,972 | Callery | Mar. 13, 1956 |
| 2,786,740 | Taylor | Mar. 26, 1957 |
| 2,827,909 | Platzke | Mar. 25, 1958 |
| 2,972,353 | Quest | Feb. 21, 1961 |
| 3,051,164 | Trexler | Aug. 28, 1962 |